United States Patent
Shiji

(10) Patent No.: US 9,484,841 B2
(45) Date of Patent: Nov. 1, 2016

(54) INVERTER DEVICE

(71) Applicant: Murata Manufacturing Co., Ltd., Nagaokakyo-shi, Kyoto-fu (JP)

(72) Inventor: Hajime Shiji, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 246 days.

(21) Appl. No.: 14/254,080

(22) Filed: Apr. 16, 2014

(65) Prior Publication Data

US 2014/0226385 A1    Aug. 14, 2014

Related U.S. Application Data

(63) Continuation of application No. PCT/JP2012/076399, filed on Oct. 12, 2012.

(30) Foreign Application Priority Data

Oct. 25, 2011    (JP) .................................. 2011-233486

(51) Int. Cl.
    *H02M 3/335*    (2006.01)
    *H02M 7/5395*    (2006.01)
    *H02M 7/48*    (2007.01)

(52) U.S. Cl.
    CPC ....... *H02M 7/5395* (2013.01); *H02M 3/33576* (2013.01); *H02M 7/4807* (2013.01); *H02M 2007/4815* (2013.01); *Y02B 70/1441* (2013.01)

(58) Field of Classification Search
    CPC .. H02M 7/42; H02M 7/4807; H02M 7/5387; H02M 7/53871; H02M 7/53873; H02M 7/5395
    See application file for complete search history.

(56) References Cited

U.S. PATENT DOCUMENTS

| | | | |
|---|---|---|---|
| 2001/0002171 A1 | 5/2001 | Abdoulin | |
| 2004/0136207 A1* | 7/2004 | Havanur | H02M 3/33592 363/21.06 |

(Continued)

FOREIGN PATENT DOCUMENTS

| | | |
|---|---|---|
| CN | 1489272 A | 4/2004 |
| EP | 0 989 660 A2 | 3/2000 |

(Continued)

OTHER PUBLICATIONS

Official Communication issued in International Patent Application No. PCT/JP2012/076399, mailed on Jan. 8, 2013.

(Continued)

*Primary Examiner* — Jeffrey Gblende
(74) *Attorney, Agent, or Firm* — Keating & Bennett, LLP

(57) ABSTRACT

A switching power supply device equipped with an inverter device includes a transformer including a primary winding and a secondary winding, which are magnetically coupled with each other. On the primary side, a capacitor and a switching element are connected in series with the primary winding and a switching element is connected in series the switching element and is connected in parallel with the primary winding and the capacitor. On the secondary side, a bidirectional switching element, which includes FETs, is connected in series with the secondary winding. A control circuit alternately turns the first switching element and the second switching element on, and turns the bidirectional switching element on in an off period of the first switching element or the second switching element. Thus, the inverter device outputs an alternating current output voltage by using a single secondary winding of a transformer.

16 Claims, 8 Drawing Sheets

(56) References Cited

U.S. PATENT DOCUMENTS

| | | |
|---|---|---|
| 2008/0037299 A1 | 2/2008 | Suzuki et al. |
| 2008/0101103 A1 | 5/2008 | Sato |
| 2010/0052423 A1* | 3/2010 | Shimada .......... H02M 3/33507 307/43 |
| 2010/0176739 A1 | 7/2010 | Naruo |
| 2011/0188269 A1* | 8/2011 | Hosotani .......... H02M 3/33592 363/21.06 |
| 2011/0222325 A1 | 9/2011 | Komatsu |
| 2013/0021827 A1* | 1/2013 | Ye .......................... H03F 1/025 363/17 |

FOREIGN PATENT DOCUMENTS

| | | |
|---|---|---|
| JP | 61-251480 A | 11/1986 |
| JP | 02-155470 A | 6/1990 |
| JP | 05-224503 A | 9/1993 |
| JP | 6-140178 A | 5/1994 |
| JP | 08-066025 A | 3/1996 |
| JP | 08-214559 A | 8/1996 |
| JP | 08-228484 A | 9/1996 |
| JP | 10-164861 A | 6/1998 |
| JP | 2000-116135 A | 4/2000 |
| JP | 2000-116154 A | 4/2000 |
| JP | 2001-275253 A | 10/2001 |
| JP | 2001-292574 A | 10/2001 |
| JP | 2006-353095 A | 12/2006 |
| JP | 2008-48484 A | 2/2008 |
| JP | 2008-109766 A | 5/2008 |
| JP | 2011-193646 A | 9/2011 |
| WO | 2008/156015 A1 | 12/2008 |

OTHER PUBLICATIONS

Official Communication issued in corresponding Chinese Patent Application No. 201280051648.0, mailed on Oct. 30, 2015.
Official Communication issued in corresponding Japanese Patent Application No. 2013-540722, mailed on Jun. 9, 2015.

* cited by examiner

INVERTER DEVICE

BACKGROUND OF THE INVENTION

1. Field of the Invention

The present invention relates to inverter devices that convert a direct current voltage into an alternating current voltage.

2. Description of the Related Art

In Japanese Unexamined Patent Application Publication No. 61-251480, an alternating current power supply device that is equipped with two power conversion circuits is disclosed. The alternating current power supply device described in Japanese Unexamined Patent Application Publication No. 61-251480 creates sinusoidal half wave voltages by alternately driving the two power conversion circuits and outputs an alternating current voltage with one of the half wave voltages serving as a positive voltage output and the other half wave voltage serving as a negative voltage output. In other words, the alternating current power supply device described in Japanese Unexamined Patent Application Publication No. 61-251480 generates a positive half period and a negative half period for an output alternating current voltage by using two power conversion circuits.

However, there is a problem with the configuration described in Japanese Unexamined Patent Application Publication No. 61-251480 in that two transformers are needed to output an alternating current voltage, the number of components inside the device is increased, and the size of the device is increased. In addition, in a circuit described in Japanese Unexamined Patent Application Publication No. 61-251480 (see, for example, FIG. 1), for example, when the negative part of the voltage is output, a current flows back toward the power conversion circuit that generates the positive part of the voltage from the output side of the circuit and therefore a normal alternating current output voltage cannot be obtained.

SUMMARY OF THE INVENTION

Accordingly, preferred embodiments of the present invention provide an inverter device that outputs an alternating current output voltage by using a single secondary winding of a transformer.

An inverter device according to a preferred embodiment of the present invention converts an input direct current voltage into an alternating current voltage and outputs the alternating current voltage, the inverter device including a transformer including a primary winding and a secondary winding that are magnetically coupled with each other, a capacitor that is connected in series with the primary winding, a first switching element that is connected in series with the primary winding, a second switching element that is connected in series with the first switching element and is connected in parallel with the serially connected primary winding and the capacitor, a switching circuit that is connected in series with the secondary winding and is conductive in two directions with respect to the secondary winding, and a controller configured and programmed to turn the first switching element, the second switching element and the switching circuit on and off, wherein the controller is configured and programmed to alternately turn the first switching element and the second switching element on, and turn the switching circuit on in an off period of the first switching element or the second switching element.

With this configuration, a current flowing through the secondary winding of the transformer is made to flow in two directions by the switching circuit, which is conductive in two directions, and an alternating current voltage is obtained with a single secondary winding. For example, a positive voltage portion of an alternating current voltage is generated by turning the switching circuit on when the second switching element is on. In addition, a negative voltage portion of an alternating current voltage is generated by turning the switching circuit on when the first switching element is on.

In an inverter device according to a preferred embodiment of the present invention, a configuration is adopted in which the controller turns the first switching element and the second switching element on and off at a duty ratio of approximately 50% with a dead time interposed between the on periods.

With this configuration, control of the switching elements on the primary side is simple, and simplification of the circuit and cost reduction are realized.

In an inverter device according to a preferred embodiment of the present invention, a configuration is adopted in which the controller sets an on period of the first switching element or the second switching element to be a fixed period that is equal to or more than half a period of resonance generated by the capacitor and a leakage inductance of the transformer, and turns the switching circuit on in the on period of the first switching element or the second switching element, whose on period has been fixed.

With this configuration, a current flowing on the secondary side is turned on and off with zero current switching (ZCS) and switching loss of the switching circuit is significantly reduced or prevented.

In an inverter device according to a preferred embodiment of the present invention, a configuration is adopted in which the switching circuit includes two FETs, each of which includes a body diode, the FETs being connected in series with each other such that directions of the body diodes thereof are oriented in opposite directions.

With this configuration, when one of the FETs is turned on, a reverse current is stopped by the body diode of the other FET. Therefore, normal MOS-FETs can be used, for example.

In an inverter device according to a preferred embodiment of the present invention, it is preferable that a configuration be adopted in which the controller turns on one of the two FETs in accordance with a direction of a current that flows due to a voltage excited in the secondary winding.

With this configuration, when one of the FETs is turned on, a reverse current is stopped by the body diode of the other FET, and therefore regeneration of energy from the secondary side to the primary side is prevented.

In an inverter device according to a preferred embodiment the present invention, a configuration may be adopted in which the switching circuit includes two switching elements that are conductive in one direction, the switching elements being connected in parallel with each other such that their conductive directions are oriented in opposite directions.

With this configuration, for example, an insulated gate bipolar transistor (IGBT) preferably is used.

In an inverter device according to a preferred embodiment of the present invention, it is preferable that a configuration be adopted in which the controller subjects at least one of the first switching element, the second switching element and the switching circuit to PWM control to output a sinusoidal voltage.

With this configuration, a sinusoidal voltage is efficiently generated by performing PWM control.

According to various preferred embodiments of the present invention, an alternating current voltage is obtained from a direct current voltage with only a single secondary winding of a transformer by providing a switching circuit that is conductive in two directions.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

Figure 1:
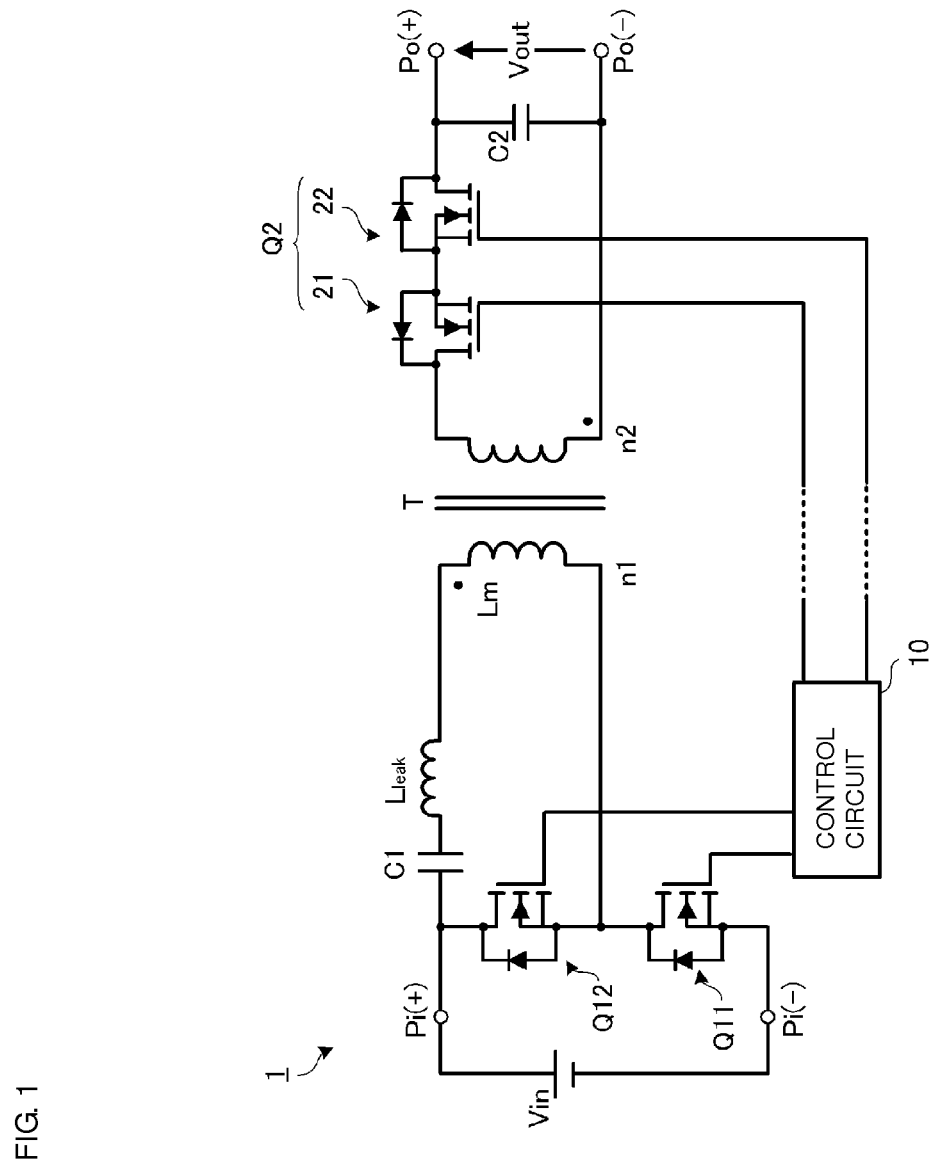
FIG. 1 illustrates an equivalent circuit of a switching power supply device according to Preferred Embodiment 1 of the present invention.

Hereafter, a switching power supply device equipped with an inverter device according to a preferred embodiment of the present invention will be described. FIG. 1 illustrates an equivalent circuit of a switching power supply device according to Preferred Embodiment 1 of the present invention. A switching power supply device 1 according to this preferred embodiment preferably includes a transformer T including one primary winding and an one secondary winding and converts an input direct current voltage into an alternating current voltage and outputs the alternating current voltage.

The switching power supply device 1 includes the transformer T in which a primary winding n1 and a secondary winding n2 are magnetically coupled with each other. In the diagram, $L_{leak}$ denotes a leakage inductance of the primary side of the transformer T and Lm denotes an excitation inductance. In FIG. 1, an equivalent circuit is illustrated in which the leakage inductance $L_{leak}$ is provided on the primary side, but the leakage inductance $L_{leak}$ may instead be provided on the secondary side.

The switching power supply device 1 includes on the primary side thereof a set of input terminals Pi(+) and Pi(−) to which a direct current voltage is input from an input power supply Vin and includes on a secondary side thereof a set of output terminals Po(+) and Po(−) from which an alternating current voltage Vout is output. The input terminal Pi(+) is a high-potential-side terminal and the input terminal Pi(−) is a low-potential-side terminal. In addition, the output terminal Po(+) and the output terminal Po(−) respectively output a positive voltage portion and a negative voltage portion of the alternating current voltage Vout.

The switching power supply device 1 includes on the primary side thereof a first switching element Q11 and a second switching element Q12, which are connected in series with each other, and includes on the secondary side thereof a bidirectional switching element (switching circuit) Q2. The switching elements Q11 and Q12 preferably are each an n-type MOS-FET including a body diode (parasitic diode). The bidirectional switching element Q2 preferably includes two n-type MOS-FETs 21 and 22 each including a body diode and is configured such that a source of the FET 21 and a source of the FET 22 are connected such that forward directions of the respective body diodes are oriented in opposite directions. The switching elements Q11 and Q12 and the bidirectional switching element Q2 (specifically the gates of the FETs 21 and 22) are connected to a control circuit 10.

The control circuit 10 performs switching control by applying a pulse-shaped driving voltage to the switching elements. The primary-side switching elements Q11 and Q12 and the secondary-side bidirectional switching element Q2 are subjected to switching control by the same control circuit 10, but the switching elements may instead be controlled by different control circuits.

A drain of the switching element Q12 is connected to the input terminal Pi(+). In addition, a source of the switching element Q11 is connected to the input terminal Pi(−) and a drain of the switching element Q11 is connected to a source of the switching element Q12.

In addition, one end of a capacitor C1 is connected to the input terminal Pi(+). The other end of this capacitor C1 is connected to the primary winding n1 of the transformer T and in addition is connected to the source of the switching element Q11 (or drain of the switching element Q12) via the primary winding n1. The capacitor C1 defines a series resonant circuit with the leakage inductance $L_{leak}$ of the transformer T.

One end of the secondary winding n2 of the transformer T is connected to the output terminal Po(+) via the bidirectional switching element Q2 and the other end of the secondary winding n2 of the transformer T is connected to the output terminal Po(−). In more detail, the drain of the FET 21, which defines a portion of the bidirectional switching element Q2, is connected to the secondary winding n2 and the drain of the FET 22, which defines a portion of the bidirectional switching element Q2, is connected to the output terminal Po(−).

A capacitor C2 is connected to the output terminals Po(+) and Po(−). A pulse voltage excited in the secondary winding n2 of the transformer T is transmitted to the output terminals side via the bidirectional switching element Q2. The capacitor C2 smoothes this pulse voltage.

In the thus-configured switching power supply device 1, the control circuit 10 alternately turns the primary-side switching elements Q11 and Q12 on and off and performs switching control on the bidirectional switching element Q2 in accordance with this timing, such that an alternating current voltage Vout is output from the output terminals Po(+) and Po(−).

Figure 2:
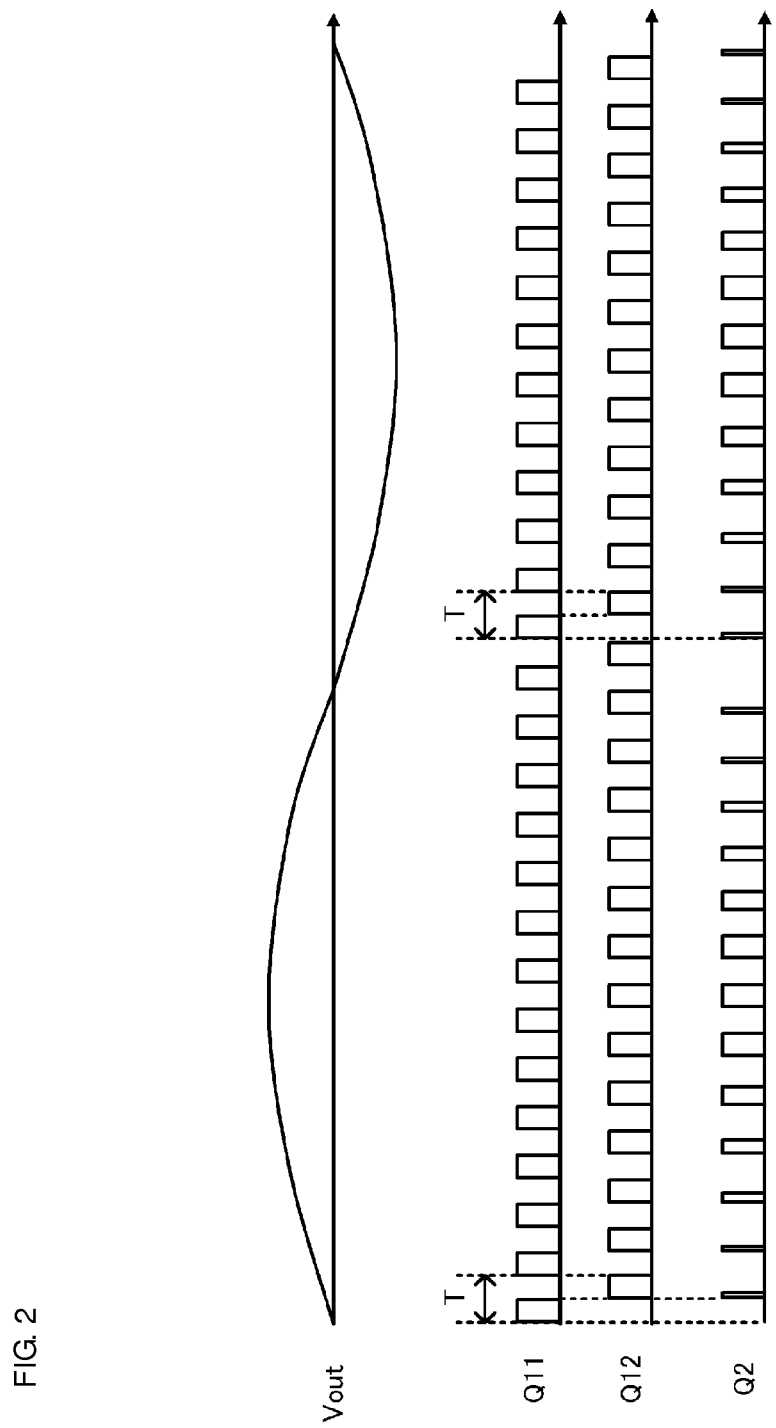
FIG. 2 illustrates the relationship between on/off timing of switching elements and an alternating current voltage Vout output from output terminals.

FIG. 2 illustrates the relationship between the on/off timing of the switching elements Q11, Q12 and Q2 and the alternating current voltage Vout output from the output terminals Po(+) and Po(−). Hereafter, "the bidirectional switching element Q2 is on" indicates that both of the FETs 21 and 22 are on and "the bidirectional switching element Q2 is off" indicates that both of the FETs 21 and 22 are off.

The control circuit 10 alternately turns the switching elements Q11 and Q12 on at a fixed duty ratio of approximately 50% with a small dead time between their on periods. In detail, for a fixed period T, the control circuit 10 turns the switching element Q11 on and turns the switching element Q12 off for a period of T/2. The control circuit 10 performs a zero voltage switching operation for the switching element Q11 by turning the switching element Q11 on in a period in which the body diode of the switching element Q12 is in a conductive state. Next, the control circuit 10 turns the switching element Q11 off and turns the switching element Q12 on for a period of T/2. The control circuit 10 performs a zero voltage switching operation for the switching element Q12 by turning the switching element Q12 on in a period in which the body diode of the switching element Q11 is in a conductive state.

In a period of output of a positive voltage portion of the alternating current voltage Vout, the control circuit 10 turns the bidirectional switching element Q2 on in an on period of the switching element Q12. In a period of output of a negative voltage portion of the alternating current voltage Vout, the control circuit 10 turns the bidirectional switching element Q2 on in an on period of the switching element Q11. That is, the control circuit 10 selects whether to turn the bidirectional switching element Q2 on in an on period of the switching element Q11 or the switching element Q12, such that whether a positive voltage or a negative voltage is output as the alternating current voltage Vout is controlled.

When the bidirectional switching element Q2 is turned on, the control circuit 10 generates a sinusoidal voltage by subjecting an on period of the bidirectional switching element Q2 (pulse width of driving voltage) to PWM control. In the case where the on period of the bidirectional switching element Q2 is short, the output voltage is low, and in the case where the on period of the bidirectional switching element Q2 is long, the output voltage is high. Thus, an alternating current voltage Vout is output from the output terminals Po(+) and Po(−).

Thus, due to the ZVS operations of the switching elements Q11 and Q12, the switching loss is reduced, and high-efficiency is realized due to the low loss and a reduction in size is realized. In addition, as result of the ZVS operations, the voltage applied to the switching elements Q11 and Q12 is equal or substantially equal to the voltage of the input power supply Vin. Accordingly, low-withstand-voltage FETs, that is, FETs having a low on resistance preferably is usable and size reduction and high efficiency are realized.

Hereafter, currents flowing through the switching elements Q11, Q12 and Q2, which are turned on and off as illustrated in FIG. 2, will be described in more detail.

Figure 3:
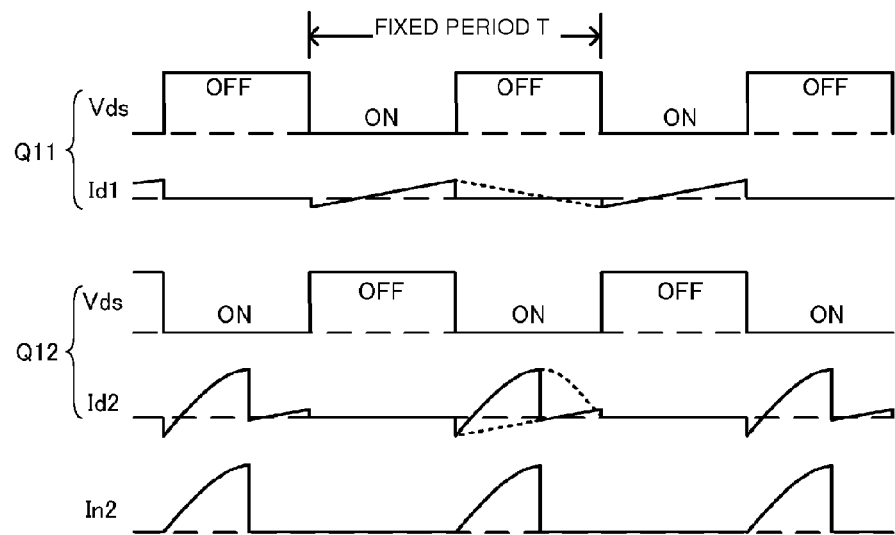
FIG. 3 illustrates waveforms of currents in switching elements at the time of output of a positive voltage portion of an alternating current voltage.

FIG. 3 illustrates waveforms of currents in the switching elements Q11, Q12 and Q2 at the time of output of a positive voltage portion of an alternating current voltage. In FIG. 3, Id1 is a waveform of a current in the switching element Q11, Id2 is a waveform of a current in the switching element Q12 and In2 is a waveform of a current flowing through the secondary winding n2 and the bidirectional switching element Q2.

In the case where the switching element Q11 is on and the switching element Q12 and the bidirectional switching element Q2 are off, on the primary side, a current flows from the input power supply Vin in a loop formed by the capacitor C1, the leakage inductance $L_{leak}$, the excitation inductance Lm and the switching element Q11. On the secondary side, a current does not flow since the bidirectional switching element Q2 is off.

On the primary side at this time, resonance is generated by a series resonant circuit including the capacitor C1, the leakage inductance $L_{leak}$ and the excitation inductance Lm, but since the resonant frequency of this series resonant circuit is sufficiently small compared with the switching frequency of the switching elements Q11 and Q12, the current Id1 of the switching element Q11 changes linearly or substantially linearly.

When the switching element Q11 is off, and the switching element Q12 and the bidirectional switching element Q2 are on, resonance is generated by the capacitor C1 and the leakage inductance $L_{leak}$. The resonant current that flows at this time is transmitted to the secondary side from the primary side via the transformer T. Consequently, the secondary side current In2 has a curved waveform similar to that of the resonant current generated by the capacitor C1 and the leakage inductance $L_{leak}$. In addition, when the bidirectional switching element Q2 is turned off, the secondary side current In2 becomes 0 and the resonance generated by the capacitor C1 and the leakage inductance $L_{leak}$ is terminated. After the bidirectional switching element Q2 has been turned off, the capacitor C1, the leakage inductance $L_{leak}$ and the excitation inductance Lm define a resonant circuit and the current of the switching element Q12 changes linearly or substantially linearly.

In an off period of the bidirectional switching element Q2, resonance is generated by the series resonant circuit including the capacitor C1, the leakage inductance $L_{leak}$ and the excitation inductance Lm, but the resonant frequency of this series resonant circuit is sufficiently small compared to the switching frequency of the switching elements Q11 and Q12. Therefore, in an off period of the bidirectional switching element Q2, the current Id2 of the switching element Q12 changes linearly or substantially linearly.

Thus, when the bidirectional switching element Q2 is turned on and a current flows on the secondary side, the current In2 flowing through the bidirectional switching element Q2 has the waveform of a resonant current generated by the capacitor C1 and the leakage inductance $L_{leak}$ acting as resonant elements. Therefore, the current In2 flowing through the bidirectional switching element Q2 has a waveform in which resonance starts from "0". With this operation, an effect in which switching loss at the time of turn on is small is obtained.

Figure 4:
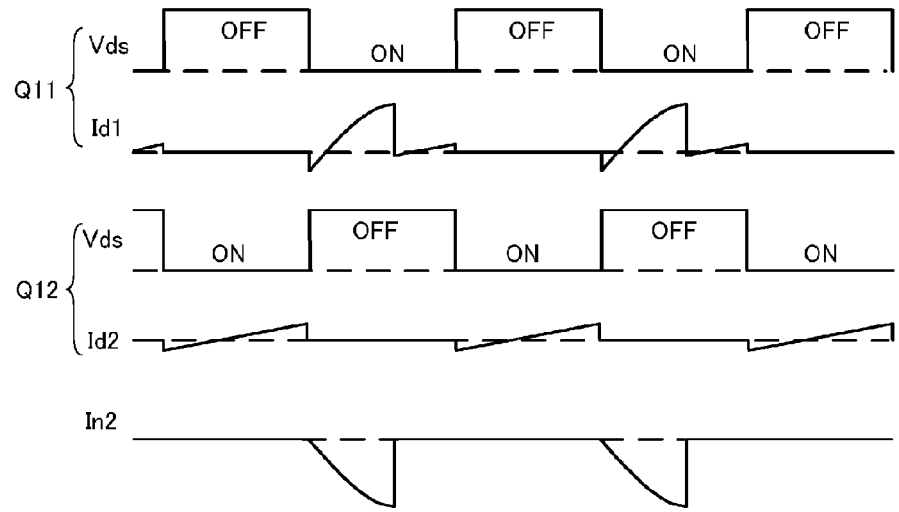
FIG. 4 illustrates waveforms of currents in switching elements at the time of output of a negative voltage portion of an alternating current voltage.

FIG. 4 illustrates current waveforms in the switching elements Q11, Q12 and Q2 at the time of output of a negative voltage portion of an alternating current voltage.

In a case where the switching element Q11 and the bidirectional switching element Q2 are off and the switching element Q12 is on, a current flows in a loop defined by the capacitor C1, the leakage inductance $L_{leak}$, the primary winding n1 and the switching element Q12. At this time, since the bidirectional switching element Q2 is off, a voltage due to electrostatic energy accumulated in the capacitor C1 is applied to the primary winding n1 and an excited current flows. Therefore, the current Id1 of the switching element Q11 through which the excited current flows has a linearly or substantially linearly increasing waveform.

In the case where the switching element Q11 and the bidirectional switching element Q2 are on and the switching element Q12 is off, on the primary side, a current flows from the input power supply Vin through a loop defined by the capacitor C1, the leakage inductance $L_{leak}$, the primary winding n1 and the switching element Q11. At this time, a resonant current generated by the capacitor C1 and the leakage inductance $L_{leak}$ flows and therefore the current Id1 of the switching element Q11 has a waveform of the resonant current.

The resonant current generated by the capacitor C1 and the leakage inductance $L_{leak}$ on the primary side is transmitted from the primary side to the secondary side via the transformer T. Consequently, the current In2 has a curved waveform similar to that of the resonant current generated by the capacitor C1 and the leakage inductance $L_{leak}$. In addition, when the bidirectional switching element Q2 is turned off, the secondary side current In2 becomes 0 and the resonance generated by the capacitor C1 and the leakage inductance $L_{leak}$ is terminated. After the bidirectional switching element Q2 has been turned off, the capacitor C1, the leakage inductance $L_{leak}$ and the excitation inductance Lm define a resonant circuit and the current of the switching element Q12 changes linearly or substantially linearly.

In addition, in the case where the bidirectional switching element Q2 is off, resonance is generated by a series resonant circuit including the capacitor C1, the leakage inductance $L_{leak}$ and the excitation inductance Lm, but since the resonant frequency of this series resonant circuit is sufficiently small compared with the switching frequency of the switching elements Q11 and Q12, the current Id2 of the switching element Q12 changes linearly or substantially linearly.

Thus, when the bidirectional switching element Q2 is on and a current flows on the secondary side, the current In2 flowing through the bidirectional switching element Q2 has the waveform of a resonant current generated by the capacitor C1 and the leakage inductance $L_{leak}$ acting as resonant elements. Therefore, the current In2 flowing through the bidirectional switching element Q2 has a waveform in which resonance starts from "0".

As has been described above, since the switching power supply device 1 according to this preferred embodiment uses the bidirectional switching element Q2 on the secondary side, the number of secondary windings is reduced as compared with the circuit of the related art. In addition, by simultaneously turning on the FETs 21 and 22 of the bidirectional switching element Q2, compared with the case where one of the FETs 21 and is turned on and a current flows through the body diode of the other, conduction loss due to a forward direction voltage of a diode is eliminated and high efficiency is realized.

In addition, in the case where a sinusoidal voltage is output from the alternating current voltage Vout, there is a risk of distortion being generated in the waveform due to the voltage in the vicinity of the zero crossing of the alternating current voltage not decreasing to zero when there is a light load such that energy extracted from the capacitor C2 to the load side is small. However, in the switching power supply device 1 according to this preferred embodiment, it is possible to perform output to the capacitor C2 for both positive and negative voltages through the on timing of the bidirectional switching element Q2. Consequently, the alternating current voltage Vout is controlled to a desired voltage value and waveform distortion is significantly reduced or prevented.

Preferred Embodiment 2

Hereafter, Preferred Embodiment 2 of the present invention will be described. The circuit configuration of the switching power supply device according to this preferred embodiment is preferably the same as that of Preferred Embodiment 1 and therefore description thereof will be omitted. In this preferred embodiment, switching control of the switching elements Q11, Q12 and Q2 is different from in Preferred Embodiment 1. This difference will be described hereafter.

Figure 5:
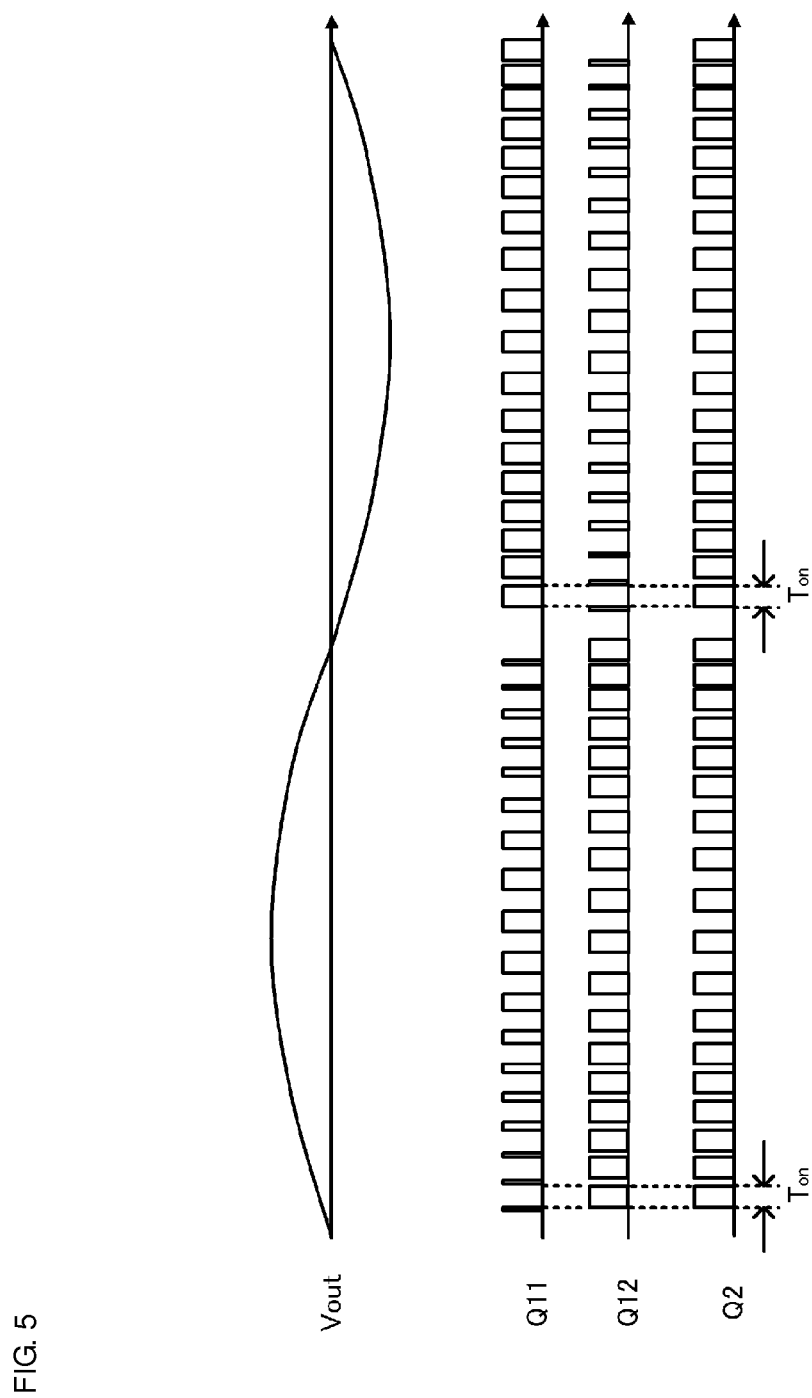
FIG. 5 illustrates the relationship between on/off timing of switching elements and an alternating current voltage Vout output from output terminals in Preferred Embodiment 2 of the present invention.

FIG. 5 illustrates the relationship between the on/off timing of the switching elements Q11, Q12 and Q2 and the alternating current voltage Vout output from the output terminals Po(+) and Po(−) in Preferred Embodiment 2. As a fundamental operation, similarly to as in Preferred Embodiment 1, the switching elements Q11 and Q12 are alternately switched on and off with a small dead time between their on periods. A positive voltage portion of the alternating current voltage is output by turning the bidirectional switching element Q2 on when the switching element Q12 is on, and a negative voltage portion of the alternating current voltage is output by turning the bidirectional switching element Q2 on when the switching element Q11 is on.

In addition, in this preferred embodiment, in the case where a positive voltage portion of the alternating current voltage is output, the on period of the switching element Q12 is fixed to Ton. The positive voltage portion of the output alternating current voltage is adjusted by adjusting the on period of the switching element Q11. Here, the on period of the switching element Q12 preferably is set to be ½ or more a resonant period T of a resonant current that flows on the primary side when the bidirectional switching element Q2 is on, that is, to be ½ the period or more, for example. The resonant period T is calculated using $T=2\pi\sqrt{(C1 \times L_{leak})}$. The bidirectional switching element Q2 is turned on and off synchronously with the switching element Q12, whose on period has been fixed.

In contrast, in the case where a negative voltage portion of the alternating current voltage is output, the on period of the switching element Q11 is fixed to Ton. The positive voltage portion of the output alternating current voltage is adjusted by adjusting the on period of the switching element Q12. Here, the on period of the switching element Q11 preferably is set to be ½ or more the resonant period T of a resonant current flowing on the primary side when the bidirectional switching element Q2 is on, for example, similarly to as in the case of the positive voltage portion. The bidirectional switching element Q2 is turned on and off synchronously with the switching element Q11, whose on period has been fixed.

Figure 6:
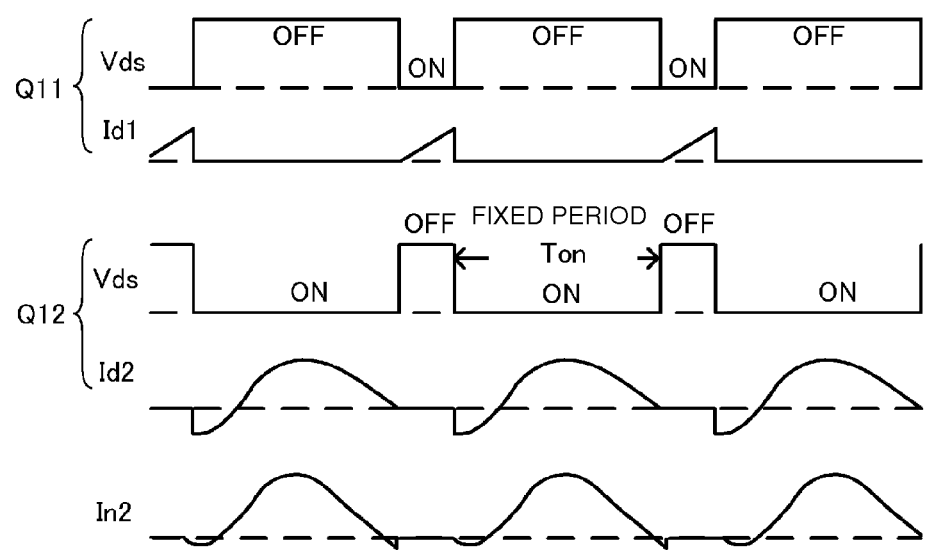
FIG. 6 illustrates the waveforms of currents in switching elements at the time of output of a positive voltage portion of an alternating current voltage.

FIG. 6 illustrates current waveforms in the switching elements Q11, Q12 and Q2 at the time of output of a positive voltage portion of an alternating current voltage. In FIG. 6, drain-source voltage waveforms are illustrated for the switching elements Q11 and Q12.

At the time of output of a positive voltage portion of an alternating current voltage, the current Id1 in the switching element Q11 when only the switching element Q11 is on is the same as a current flowing through the primary winding n1 and has a waveform that increases linearly or substantially linearly with time. On the other hand, when the switching element Q12 is on, the bidirectional switching element Q2 is also on and the current Id2 of the switching element Q12 has the waveform of a resonant current. In addition, since the bidirectional switching element Q2 is turned on and off simultaneously with the switching element Q12, the current In2 has the waveform of a resonant current, similarly to the current Id2 of the switching element Q12. By performing control in order to make the on period of the bidirectional switching element Q2 match the resonant period T, the current In2 is turned on in the vicinity of 0. Thus, an effect of reducing switching loss is obtained.

Since the case where a negative voltage portion of an alternating current voltage is output is the same as that illustrated in FIG. 6 but with the switching elements Q11 and Q12 reversed, illustration and description thereof is omitted.

Preferred Embodiment 3

Hereafter, Preferred Embodiment 3 of the present invention will be described. The circuit configuration of the switching power supply device and the switching control of the switching elements Q11 and Q12 according to this preferred embodiment are preferably the same as in Preferred Embodiments 1 and 2 and therefore description thereof is omitted. In this preferred embodiment, switching control of the bidirectional switching element Q2 is different from in Preferred Embodiments 1 and 2. This difference will be described hereafter.

Figure 7:
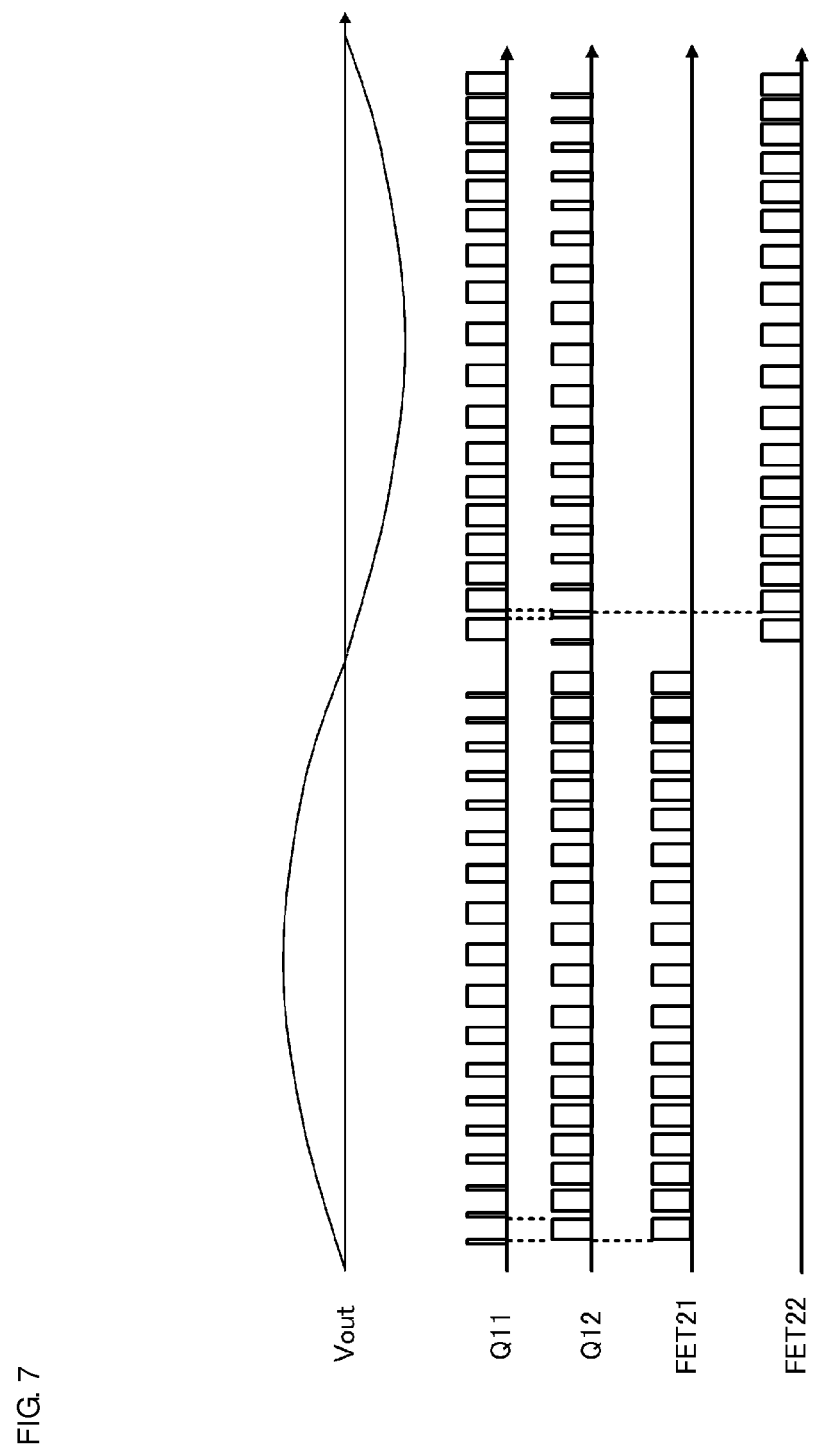
FIG. 7 illustrates the relationship between on/off timing of switching elements and an alternating current voltage Vout output from output terminals in Preferred Embodiment 3 of the present invention.
Figure 8:
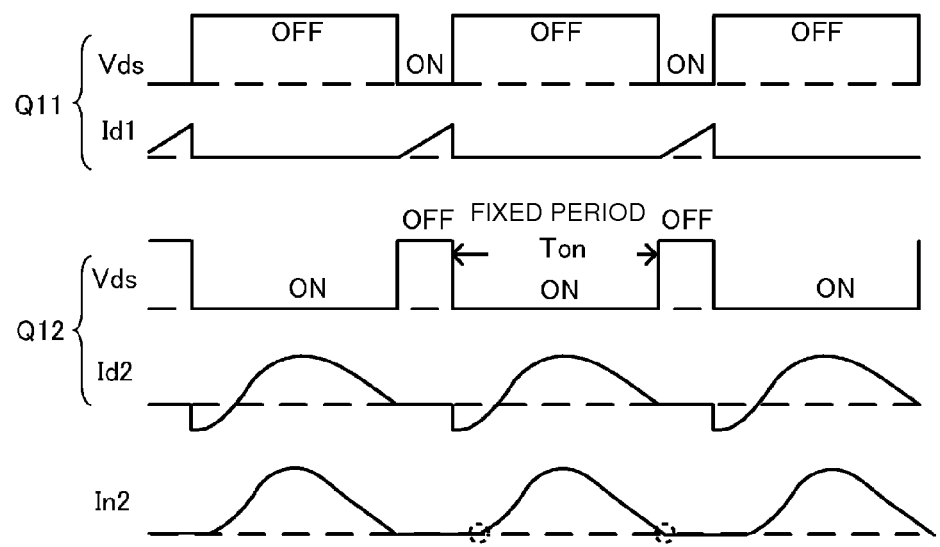
FIG. 8 illustrates waveforms of currents in switching elements and FETs of a bidirectional switching element at the time of output of a positive voltage portion of an alternating current voltage.

FIG. 7 illustrates the relationship between the on/off timing of the switching elements Q11, Q12 and Q2 and the alternating current voltage Vout output from the output terminals Po(+) and Po(−) in Preferred Embodiment 3. FIG. 8 illustrates current waveforms of the switching elements Q11 and Q12 and of the FET 21 of the bidirectional switching element Q2 at the time of output of a positive voltage portion of an alternating current voltage.

In contrast to the FETs 21 and 22 of the bidirectional switching element Q2 being simultaneously turned on and off in Preferred Embodiments 1 and 2, in this preferred embodiment, the FET 21 is turned on at the time of output of a positive voltage portion of an alternating current voltage and the FET 22 is turned on at the time of output of a negative voltage portion of an alternating current voltage. In the case where the FET 21 is turned on, a reverse flow current is prevented from flowing from the output terminal Po(+) to the secondary winding n2 by the body diode of the FET 22. As a result, as indicated by the broken line circles in FIG. 8, the current In2 flowing in the FET 21 of the bidirectional switching element Q2 is prevented from becoming "negative", in contrast to the waveform illustrated in FIG. 6. Here, "negative" refers to a direction opposite to a positive direction which is from the drain to the source of the FET 21.

In addition, in the case where the FET 22 is turned on, a reverse flow current is prevented from flowing from the secondary winding n2 to the output terminal Po(+) by the body diode of the FET 21. As a result, although not illustrated, the current In2 flowing in the FET 22 of the bidirectional switching element Q2 is prevented from becoming "negative", which is a direction opposite to a positive direction from the drain to the source of the FET 22.

As has been described above, control is stable because reverse flow of a current does not occur due to the action of a diode after the current flowing on the secondary side becomes 0 due to resonant operation on the primary side. In addition, in Preferred Embodiment 1, the FETs 21 and 22 are simultaneously turned on, whereas in this preferred embodiment the FETs 21 and 22 are alternately turned on, and therefore a reverse flow current is prevented by a body diode. As a result, regeneration of energy from the secondary side to the primary side is prevented.

Appropriate design modifications can be made to the specific configuration and so forth of the switching power supply device 1 and the operation and effect detailed in the above-described preferred embodiments are simply an example of the most preferable operation and effects of the present invention and the operation and effects of the present invention are not limited to those detailed in the above-described preferred embodiments.

For example, in the above-described preferred embodiments, a case was described in which the leakage inductance $L_{leak}$ and the capacitor C1 on the primary side of the transformer T preferably are used as resonant elements, but a case in which a leakage inductance and a capacitor C1 on the secondary side of the transformer T are used as resonant elements would be similar. In such a case, it would be necessary to consider the turn ratio between the primary winding n1 and the secondary winding n2 of the transformer T.

The leakage inductance $L_{leak}$ of the transformer T preferably is used as a resonant element in the above-described preferred embodiments, but the same effect can also be obtained in a case where another inductance element is newly connected in series with the primary winding or the secondary winding of the transformer T and using a combined value of the leakage inductance $L_{leak}$ and the added inductance element as a resonant element. In such a case, the number of components is increased but a desired resonant circuit constant is easily set.

In addition, the capacitor C1 preferably is connected in series between the primary winding n1 and the input terminal Pi(+), but instead a circuit configuration may be adopted in which the capacitor C1 is connected in series between the primary winding n1 and the switching elements Q1 and Q2.

Figure 9A:
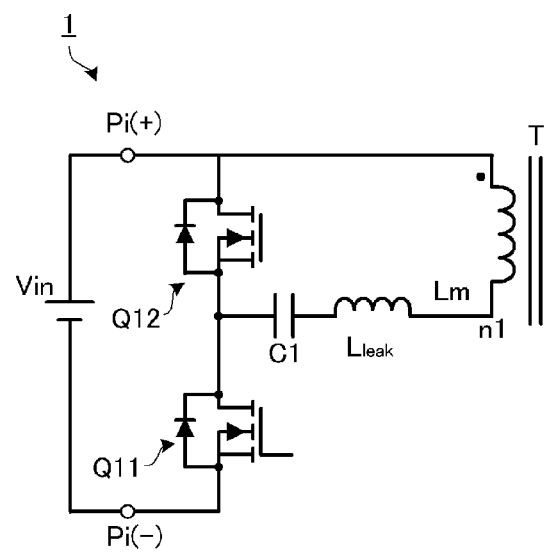
FIG. 9A illustrates a modification of a primary side circuit configuration.
Figure 9B:
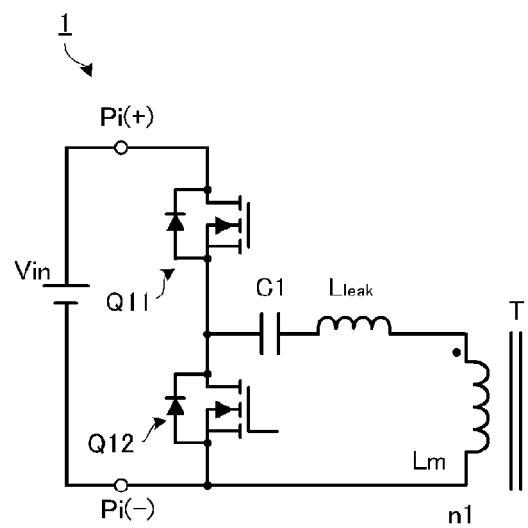
FIG. 9B illustrates a modification of a primary side circuit configuration.

In addition, the way in which the primary winding n1 and the switching elements Q1 and Q2 are connected is not limited to that illustrated in FIG. 1. FIG. 9A and FIG. 9B illustrate modifications of the circuit configuration on the primary side. As illustrated in FIG. 9A, the capacitor C1 and the leakage inductance $L_{leak}$ may be on the switching element Q11 side. In addition, as illustrated in FIG. 9B, the connection position of the switching elements Q11 and Q12 may be the reverse of that illustrated in FIG. 1.

Figure 10:
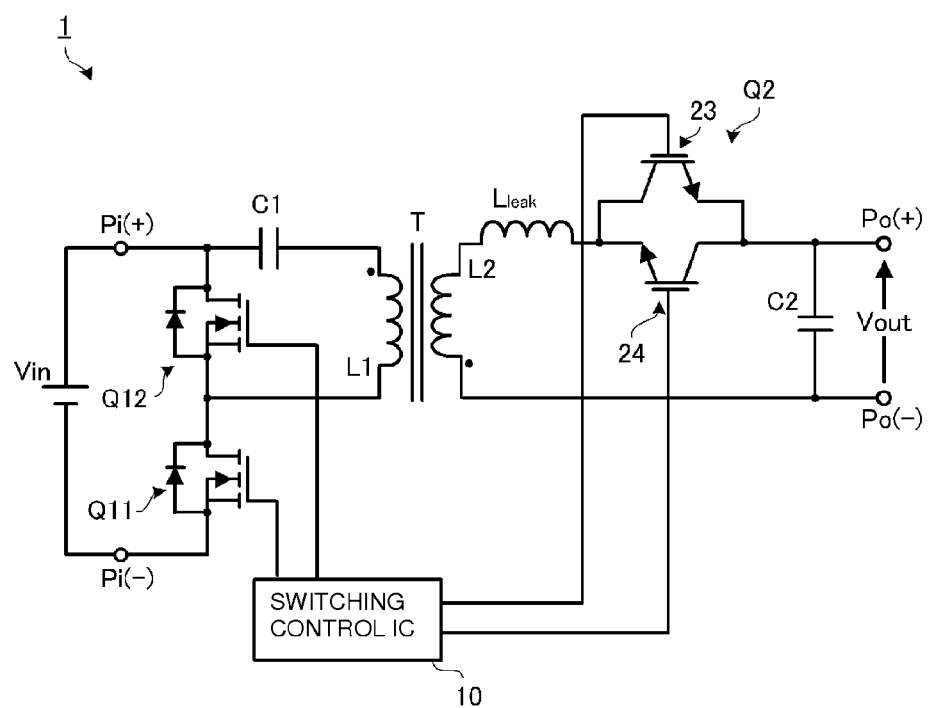
FIG. 10 illustrates a circuit in which the configuration of a bidirectional switching element in a switching power supply device is different.

In addition, for example, the configuration of the bidirectional switching element Q2 is not limited to that included in the above-described preferred embodiments. FIG. 10 illustrates a circuit in which the configuration of the bidirectional switching element Q2 in the switching power supply device 1 is different. The leakage inductance $L_{leak}$ is provided on the secondary side. In FIG. 10, the bidirectional switching element Q2 is configured such that IGBTs 23 and 24 are connected in parallel with each other such that their collector-emitter directions are reversed. In this case, similarly to as in Preferred Embodiment 3, regeneration of energy from the secondary side to the primary side is prevented. In addition, in contrast to the FETs 21 and 22 being connected in series as in Preferred Embodiment 1, in FIG. 10, the IGBTs 23 and 24 are connected in parallel with each other and therefore voltage loss in the bidirectional switching element Q2 is significantly reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inverter device that converts an input direct current voltage into an alternating current voltage and outputs the alternating current voltage, the inverter device comprising:
   a transformer including a primary winding and a secondary winding that are magnetically coupled with each other;
   a capacitor that is connected in series with the primary winding;
   a first switching element that is connected in series with the primary winding;
   a second switching element that is connected in series with the first switching element and is connected in parallel with the serially connected primary winding and capacitor;
   a switching circuit that is connected in series with the secondary winding and is conductive in two directions with respect to the secondary winding; and
   a controller configured and programmed to turn the first switching element, the second switching element and the switching circuit on and off; wherein
   the controller is configured and programmed to alternately turn the first switching element and the second switching element on, to turn the switching circuit on in an off period of the first switching element or the second switching element, to set an on period of the first switching element or the second switching element to be a fixed period that is equal to or more than half a period of resonance generated by the capacitor and a leakage inductance of the transformer, and to turn the switching circuit on in the on period of the first switching element or the second switching element, which has a fixed on period.

2. The inverter device according to claim 1, wherein the controller is configured and programmed to turn the first switching element and the second switching element on and off at a duty ratio of approximately 50% with a dead time interposed between the on periods.

3. The inverter device according to claim 1, wherein the switching circuit includes two FETs, each of which includes a body diode, the FETs being connected in series with each other such that directions of the body diodes thereof are oriented in opposite directions.

4. The inverter device according to claim 3, wherein the controller is configured and programmed to turn on one of the two FETs in accordance with a direction of a current that flows due to a voltage excited in the secondary winding.

5. The inverter device according to claim 1, wherein the switching circuit includes two switching elements that are conductive in one direction, the switching elements being connected in parallel with each other such that conductive directions thereof are oriented in opposite directions.

6. The inverter device according to claim 1, wherein the controller is configured and programmed to subject at least one of the first switching element, the second switching element and the switching circuit to PWM control to output a sinusoidal voltage.

7. The inverter device according to claim 1, wherein a leakage inductance of the transformer is present on one of a primary side and a secondary side of the transformer.

8. The inverter device according to claim 1, wherein the first and second switching elements are each an n-type MOS-FET including a body diode.

9. The inverter device according to claim 1, wherein the switching circuit includes two n-type MOS-FETs each including a body diode.

10. The inverter device according to claim 1, wherein the controller is configured and programmed to perform switching control by applying a pulse-shaped driving voltage to the first and second switching elements.

11. The inverter device according to claim 1, wherein the controller is configured and programmed to perform switching control by using a zero voltage switching operation of the first and second switching elements.

12. The inverter device according to claim 11, wherein the controller is configured and programmed to perform switching control such that a voltage applied to the first and second switching elements is equal or substantially equal to a voltage of the input direct current voltage.

13. The inverter device according to claim 1, wherein the controller is configured and programmed to perform switching control such that after one of the first and second switching elements is turned off, a resonant circuit is defined by the capacitor, a leakage inductance of the transformer, and an excitation inductance.

14. The inverter device according to claim 1, wherein the capacitor and a leakage inductance of the transformer define resonant elements on one of a primary side and a secondary side of the transformer.

15. The inverter device according to claim 1, wherein the capacitor is connected in series between the primary winding and an input terminal, or the capacitor is connected in series between the primary winding and the first and second switching elements.

16. A switching power supply apparatus comprising the inverter device according to claim 1.

* * * * *